United States Patent [19]

Tone et al.

[11] Patent Number: 5,116,910
[45] Date of Patent: May 26, 1992

[54] PREPARATION METHOD OF COMB COPOLYMER, ACRYLIC COMB COPOLYMER, AND IMPACT RESISTANT RESIN COMPOSITION

[75] Inventors: Seiji Tone, Ohtake; Haruko Takeda, Fujisawa; Masahiro Sugimori, Nagoya, all of Japan

[73] Assignee: Mitsubishi Rayon Co., Ltd., Tokyo, Japan

[21] Appl. No.: 711,950

[22] Filed: Jun. 7, 1991

Related U.S. Application Data

[62] Division of Ser. No. 399,992, Aug. 29, 1989, Pat. No. 5,053,461.

[30] Foreign Application Priority Data

Aug. 31, 1988 [JP] Japan ............................ 63-215128
Sep. 5, 1988 [JP] Japan ............................ 63-220431

[51] Int. Cl.⁵ ..................... C08F 265/06; C08L 31/02
[52] U.S. Cl. ..................... 525/244; 525/80; 525/263; 525/308; 525/309; 525/243
[58] Field of Search ............ 525/244, 263, 308, 309

[56] References Cited

U.S. PATENT DOCUMENTS 3,879,494  4/1975  Milkovich et al. ............ 525/309
4,654,417  3/1987  Inoue et al. ................. 528/416
4,690,956  9/1987  Ramlow et al. ............. 525/450

FOREIGN PATENT DOCUMENTS 248574  12/1987  European Pat. Off.

Primary Examiner—John C. Bleutge
Assistant Examiner—Vasu S. Jagannathan
Attorney, Agent, or Firm—Oblon, Spivak, McClelland, Maier & Neustadt

[57] ABSTRACT

A comb copolymer consisting of a methacrylic macromonomer as a branch ingredient and acrylic ester as a backbone ingredient and being suitable for an acrylic elastomer material which is excellent in transparency, weatherability and mechanical strength; an impact resistant acrylic resin composition obtained by blending the above comb copolymer with a PMMA (co)polymer; and a comb copolymer similarly consisting of a methacrylic macromonomer as a branch component and acrylic ester as a backbone component and being an acrylic resin which is excellent in transparency, weatherability, gloss and light resistance, are disclosed in this invention.

Preparation methods of the high molecular weight comb copolymers useful for molding materials comprising the above mentioned comb copolymers are disclosed. The disclosed preparation methods comprise, in the copolymerization of the macromonomer having a vinyl group at one end of the main chain with a vinyl monomer, conducting aqueous suspension polymerization of the monomer mixture in the presence of an initiator in a solvent which is a good solvent for the macromonomer and has a solubility of 10% by weight or more in water at 30° C., or conducting aqueous suspension polymerization of the monomer mixture in the presence of an initiator in a halogenated hydrocarbon solvent which is a good solvent for the macromonomer and has an azeotropic point with water ranging from 30° to 90° C. at a temperature above said azeotropic point.

6 Claims, No Drawings

PREPARATION METHOD OF COMB COPOLYMER, ACRYLIC COMB COPOLYMER, AND IMPACT RESISTANT RESIN COMPOSITION

This is a continuation of application Ser. No. 07/399,992, filed on Aug. 29, 1989 U.S. Pat. No. 5,053,461.

BACKGROUND OF THE INVENTION

1. Field of the Invention

The present invention relates to a comb copolymer suitable for use as an acrylic elastomer which is excellent in transparency, weatherability and mechanical properties; to a methylmethacrylate (co)copolymer blended with the comb copolymer; to a comb copolymer as an acrylic resin which is excellent in transparency, weatherability, gloss and light resistance; and to a preparation method of a high molecular weight comb copolymer useful as a molding material comprising the above comb copolymer.

2. Description of the Prior Art

Methyl methacrylate polymer and copoymers have been conventionally used for cast sheets, injection-molded articles and extruded products as resins which are excellent in transparency, gloss and weatherability. On the other hand, these resins are hard and brittle and it is hence difficult to prepare, for example, films and sheets from them. Consequently, the field of application of these resins has been limited until now. In order to eliminate the disadvantages of hardness and brittleness, various methods have been proposed such as a method for blending elastomers with the methyl methacrylate (co)polymers and a method for grafting methyl methacrylate on elastomers. The method for grafting methyl methaclrylate on the elastomers exhibits a particularly remarkable effect. Accordingly, various proposals have been made about the kinds of the elastomers used and the methods for graft polymerization. These proposals include, for example, a method for using diene polymers such as polybutadiene as the elastomers and a method for using acrylic elastomers. The former method, however, has a drawback in that it causes a severe decrease in weatherability of resulting polymers due to double bonds contained in the elastomers. The latter method is also disadvantageous in that a large amount of the acrylic elastomers must be used in order to obtain a satisfactory effect, because the latter method is less effective in the improvement than the former method, which situation inevitably leads to a decrease in transparency and gloss of the resulting polymers.

On the other hand, styrene-diene block copolymers and polyester-polyether block copolymers have already been developed for the materials of thermoplastic elastomers. Acrylic elastomer materials, however, have not yet proven satisfactory, although there has been a need for these materials in view of their excellent transparency and weatherability.

In order to develop acrylic elastomers, anion living polymerization has also been tried as in the case of the styrene-diene block copolymers. However, satisfactory results have not yet been obtained because of the difficulty in completely carrying out living polymerization of acrylic esters. A method for grafting methacrylic esters on cross-linked acrylic rubber has also been investigated. However, satisfactory products have not been developed, because the processability and transparency of the resulting copolymers has decreased with the increasing ratio of the acrylic rubber component.

In order to enhance the functions and performances of polymeric materials, the development of block copolymers and graft copolymers has been carried out until now. Since technical progress has recently been made in the synthesis of oligomers and polymers having a polymerizable functional group at one end of the main chain, attention has been focused on the development and application of comb copolymers derived from these oligomers and polymers. Preparation of comb copolymers from these oligomers or polymers and common vinyl monomers is generally carried out by a solution polymerization method where both materials are dissolved with a polymerization initiator and copolymerized in a suitable solvent. Bulk polymerization or suspension polymerization may also be conducted using the vinyl monomer dissolved with the above oligomers or polymers and the polymerization initiator.

The above solution polymerization method has the advantage of allowing the polymerization to progress with ease. On the other hand, since there is the problem that the method is liable to cause chain transfer reaction into the solvent, comb copolymer having high molecular weights are difficult to produce. Consequently, it has been difficult to employ products obtained by solution polymerization for uses requiring mechanical properties, for example, elastomers and molding materials.

The method for conducting bulk polymerization or suspension polymerization by using the vinyl monomer dissolved with the oligomers or the polymers has the advantage that high molecular weight copolymers can be obtained with ease as compared with solution polymerization method. On the other hand, there is the problem that comb copolymers having high ratios of the oligomer or polymer components are difficult to obtain because the solubility of said oligomers or polymers in the vinyl monomer is not so high.

As described above, the prior art aimed at manufacturing copolymers having specific structure and thus having specific properties, that is, comb copolymers but provided merely copolymers having either low molecular weights or high ratios of the vinyl monomer components. Consequently, comb copolymers having the desired characteristics have not yet been obtained.

SUMMARY OF THE INVENTION

An object of this invention is to provide a method for the preparation of a comb copolymer which allows selection of ratios of a macromonomer constituting the branch part of the comb copolymer to a vinyl monomer constituting the backbone part of the comb copolymer.

Another object of this invention is to provide a manufacturing method which can prepare a comb copolymer having a considerably high molecular weight.

A further object of this invention is to provide a novel acrylic elastomer having the structure of a comb copolymer and maintaining the characteristics of acrylic elastomers such as excellent transparency and weatherability.

Still another object of this invention is to provide a comb copolymer resin which is an acrylic resin having an outstanding impact resistance, while maintaining the excellent characteristics of acrylic resins such as transparency, weatherability and gloss.

Yet another object of this invention is to provide a methacrylic resin composition having improved impact strength.

According to this invention, there is provided a preparation method for a comb copolymer comprising mixing a polymer having a vinyl group at one end of the main chain and having a number average molecular weight of 3,000 to 50,000, with a vinyl monomer and a polymerization initiator in a solvent which is a good solvent for said polymer and has solubility in water of 10% by weight or more at 30° C., and subjecting the resultant mixture to aqueous suspension polymerization.

According to this invention, there is also provided a preparation method for a comb copolymer comprising mixing a polymer having a vinyl group at one end of the main chain and having a number average molecular weight of 3,000 to 50,000, with a vinyl monomer and a polymerization initiator in a halogenated hydrocarbon solvent which is a good solvent for said polymer and has an azeotropic point with water ranging from 30° to 90° C., and subjecting the resultant mixture to aqueous suspension polymerization above the azeotropic temperature of said solvent with water.

According to this invention, there is further provided an acrylic comb copolymer which is prepared by copolymerizing 20 to 60 parts by weight of a methacrylic macromonomer which has a vinyl group at one end of the main chain, a number average molecular weight of 3,000 to 50,000 and a glass transition temperature of 40° C. or more, with 80 to 40 parts by weight of an acrylic ester having a glass transition temperature of the homopolymer of 0° C. or less, which copolymer has a polystyrene reduced molecular weight corresponding to the peak top of the molecular weight distribution curve measured by the GPC method of 50,000 or more.

According to the present invention, there is further provided an acrylic resin composition which is obtained by blending 5 to 50 parts by weight of the above acrylic comb copolymer with 100 parts by weight of the methyl methacrylate (co)polymer and which has excellent impact resistance.

According to the present invention, there is still further provided an impact resistant acrylic resin comprising an acrylic comb coplymer which is prepared by copolymerizing 60 to 90 parts by weight of a methacrylic macromonomer having a vinyl group at one end of the main chain, a number average molecular weight of 3,000 to 50,000 and a glass transition temperature of 40° C. or more, with 40 to 10 parts by weight of an acrylic ester having a glass transition temperature of the homopolymer of 0° C or less, which copolymer has molecular weight corresponding to the peak top of the molecular weight distribution curve measured by the GPC method of 50,000 or more.

It is to be noted that the term "molecular weight corresponding to the peak top of the molecular weight distribution curve measured by the GPC method" in the present invention means the molecular weight which is reduced by applying the resulting peak top value of the GPC elution curve to the working curve obtained by using polystyrenes which have almost no variation in molecular weight distribution.

DETAILED DESCRIPTION OF THE INVENTION

The two preparation methods of the comb copolymer of this invention are illustrated hereinafter.

The polymer having a vinyl group at one end of the main chain (hereinafter abbreviated as macromonomer) for use in the preparation methods of this invention must have a number average molecular weight of 3,000 to 50,000. A macromonomer having a molecular weight of less than 3,000 cannot provide a comb copolymer with satisfactory properties. On the other hand, a macromonomer having a molecular weight of more than 50,000 is unfavorable because of a decrease in reactivity.

The monomer unit which constitutes the main chain of the macromonomer may be a common vinyl monomer being capable of radical polymerization. Illustrative examples of the vinyl monomer include various methacrylic esters, acrylic esters and styrene. The vinyl monomer may be used alone or as a mixture. When the large part of monomer unit constituting the main chain of the macromonomer is methyl methacrylate, this macromonomer is abbreviated as methacrylic macromonomer. The macromonomer can be prepared by various methods, for example, by the method comprising conducting anion living polymerization of methyl methacrylate (MMA) and successively reacting the resultant intermediate with a halogen containing vinyl compound; by the method comprising conducting radical polymerization of the vinyl monomer in the presence of mercaptoacetic acid and successively reacting the resultant polymer or oligomer with a monomer containing glycidyl groups such as glycidyl methacrylate; and by the method comprising conducting the polymerization of a vinyl monomer such as MMA by using vinylphenylketenetrimethylsilyl acetal as an initiator and successively reacting the resultant intermediate with p-vinylbenzyl or a halogen containing vinyl compound.

The macromonomer thus prepared constitutes the branch part of the comb copolymer prepared by the method of this invention.

Any kind of vinyl monomer may be used in the method of this invention so long as the monomer can be polymerized by a common radical polymerization method. Exemplary vinyl monomers include, for example, acrylic esters, methacrylic esters, styrene and acrylonitrile. The vinyl monomer can be used alone or in combination. However, in view of forming the comb copolymer, the vinyl monomer used in this step is preferably different from the monomer ingredient used for constituting the main chain of the macromonomer.

The solvent for use in the first preparation method of this invention must be a good solvent for the macromonomer and also must have a solubility in water of 10% by weight or more at 30° C. When the solubility of the solvent in water is less than 10% by weight, the solvent does not diffuse into water during polymerization and causes unfavorable effects. For example, a considerable amount of the solvent remains in the vicinity of the monomer during polymerization, leads to a chain transfer reaction and inhibiting formation of a high molecular weight polymer. A large amount of the solvent remaining in the resulting polymer, causes fusing of the polymer and makes the polymer difficult to handle. It is preferred to select the solvent for use in consideration of the chain transfer constant to the propagating radical of the solvent. A solvent having a large chain transfer constant tends to have an adverse effect on the formation of the high molecular weight polymer, even though procedures as in the present invention are carried out. Exemplary solvents suitable for use in the methacrylic macromonomer include, for example, acetone, methyl ethyl ketone, tetrahydrofuran, oxane, acetonitrile, 1,2-dimethoxyethane, 1,2-diethoxyethane, 1,2-diacetoxyethane, methyl acetate and Y-butyrolactone. Other solvents can also be used in the method of this invention.

The weight ratio of the macromonomer to the vinyl monomer for use in the method of this invention can be set in an arbitrary range depending upon the comb copolymer desired. The range is preferably from 95/5 to 10/90, and more preferably from 90/10 to 30/70. When the ratio of the macromonomer exceeds 95% by weight, it becomes difficult to obtain a high molecular weight polymer even by the method of this invention. On the other hand, a ratio less than 10% by weight reduces the advantages of this invention, because suspension polymerization can be carried out without applying the method of this invention which uses the solvent. The solvent is preferably used in an amount of 30 to 300 parts by weight per 100 parts by weight of the macromonomer. An amount of the solvent less than 30 parts by weight cannot provide sufficient dilution effect, and satisfactory dissolution of the macromonomer in the vinyl monomer becomes difficult. When the amount of the solvent is in excess of 300 parts by weight, formation of the high molecular weight polymer becomes difficult and polymerization stability is also decreased.

The polymerization initiator for use in this invention is any commonly available initiator for radical polymerization. Preferred examples of these initiators are peroxide type initiators such as benzoyl paperoxide and lauroyl peroxide and azo type intiators such as azobisisobutyronitrile.

If necessary, chain transfer agents such as noctyl mercaptan may also be used. However, the amount used is preferably limited to a range which does not reduce the molecular weight greatly.

In the first preparation method of this invention, a uniformly mixed solution is prepared by mixing the above macromonomer with the vinyl monomer and the radical polymerization initiator in the above good solvent for the macromonomer. After adding a dispersing agent, the resulting mixture is poured into water and thoroughly stirred to obtain a suspension. Polymerization is carried out in this suspended state.

In other words, in the first preparation method of this invention, the uniformly mixed solution of the macromonomer, vinyl monomer and the polymerization initiator is prepared by using a solvent. Suspension is formed by using the uniformly mixed solution. At the forming step of the suspension, each suspended particle is composed of the above uniformly mixed solution. Since the solvent used in this invention has a solubility of 10% by weight or more in water and is also a good solvent for the macromonomer, it migrates to some extent but not completely from the suspended particle into the aqueous medium in the forming step of the suspension. The solvent migrates to the aqueous medium with the progress of polymerization in the suspended particles. Almost no solvent is remains in the suspended particles at the end of polymerization.

The weight ratio of the total amount of the monomers, i.e., the sum of the macromonomer and the vinyl monomer, to the amount of water should be in the range which does not adversely effect the stability of polymerization. The amount of water should be in an amount sufficient to dissolve the total amount of the solvent used for the formation of the monomer mixture. The preferred weight ratio of the monomer to water is from 1/1.5 to 1/6, more preferably from ⅓ to 1/5. Other conditions of the suspension polymerization in this invention may be the same as in ordinary suspension polymerization.

The present inventors have further investigated the first preparation method described above. As a result, they found that a specific halogenated hydrocarbon solvent can be used for the solvent of the suspension polymerization of the above comb copolymer by employing a specific polymerization condition, even though the solvent has a solubility of less than 10% by weight in water at 30° C. As a result, the second preparation method of this invention has completed as described below.

The second preparation method of the comb copolymer of this invention comprises mixing the macromonomer with the vinyl monomer and the polymerization initiator in the halogenated hydrocarbon solvent which is a good solvent for the macromonomer and forms an aqueous azeotrope at a temperature ranging from 30° to 90° C., and subjecting the resultant mixture to aqueous suspension polymerization above the azeotropic temperature of said solvent with water.

The solvent for use in the second preparation method of this invention is a good solvent for the macromonomer and dissolves the macromonomer satisfactorily. The solvent must be a halogenated hydrocarbon which is insoluble in water (solubility in water is less than 10% by weight or less at 30° C.) and must have an azeotropic point with water ranging from 30° to 90° C., more preferably ranging from 30° to 80° C. Representative examples of the solvent are chloroform and 1,2-dichloroethane.

When the solvent used has an azeotropic point with water above 90° C., the temperature of the polymerization system is still below the azeotropic temperature of the solvent even though polymerization is carried out at about 90° C., and the solvent in the suspended particles cannot be removed. Consequently, a considerable amount of the solvent remains in the vicinity of the monomer during polymerization, causing a chain transfer reaction and inhibiting the formation of a high molecular weight polymer. A large amount of the solvent also remains in the resulting polymer and the polymer thus obtained tends to fuse and becomes difficult to handle.

Since a solvent which forms an aqueous azeotrope below 30° C. starts boiling at ordinary temperature, it is unfavorable because of difficulty in handling.

Solvents which form azeotropic mixtures with water at a temperature ranging from 30° to 90° C. are not always suitable for use in this invention. Only halogenated solvents can be used. The reason is not yet clearly understood; however, it is assumed that such factors as the ratio of the solvent in the aeotrope, boiling point and vapor pressure of the solvent itself, solubility in water and affinity for the polymer formed are responsible for the phenomenon. Solvents containing no halogen atoms are unsuitable even though they form an aqueous azeotrope in the above temperature range, because many solvents lead to fusing of the polymer.

The same reaction conditions as in the first preparation method of this invention can also be employed for the polymerization conditions such as the ratio of the macromonomer to the vinyl monomer, the amount of solvent, and the weight ratio of the monomer to water.

It is not necessary to keep the polymerization temperature above the aforesaid zeotropic point from initiation to completion of polymerization. However, it is necessary to maintain the polymerization temperature above the aforesaid azeotropic point long enough to almost completely remove the solvent in the suspended particles before completing the polymerization. The polymerization temperature is preferably less than 100° C.

In the first and second preparation methods of this invention, the comb copolymer is obtained in the form of polymer particles having a particle size of 10 μm to 2 mm as in the case of ordinary suspension polymerization. Then, the reaction product may be cooled, filtered, dehydrated and washed to obtain the polymer. When the kind of the solvent and the temperature during polymerization satisfy the requirements as specified in the present invention, the polymer formed does not fuse and can be obtained in the form of particles having a uniform particle size.

Next, the acrylic comb copolymer of this invention will be illustrated hereinafter.

The acrylic comb copolymer of this invention can be obtained by copolymerizing 20 to 90 parts by weight of a methacrylic ester polymer (hereinafter abbreviated as methacrylic macromonomer) which has a vinyl group at one end of the main chain, a number average molecular weight of 3,000 to 50,000 and a glass transition temperature of the homopolymer of 40° C. or more, with 80 to 10 parts by weight of an acrylic ester monomer.

The resulting comb copolymer differs somewhat in properties and use depending upon the ratio of the above methacrylic macromonomer to the acrylic ester monomer.

The acrylic comb copolymer prepared by copolymerizing 20 to 60 parts by weight of the methacrylic macromonomer with 80 to 40 parts by weight of the acrylic ester monomer is useful as a elastomer having excellent transparency, weatherability and mechanical properties and is abbreviated as "comb elastomer" hereinafter.

On the other hand, the acrylic comb copolymer prepared by copolymerizing 60 to 90 parts by weight of the methacrylic macromonomer with 40 to 10 parts by weight of the acrylic ester monomer is useful as an acrylic resin having excellent transparency, weatherability, gloss and impact resistance and is abbreviated as "comb resin" hereinafter.

The methacrylic macromonomer used in this invention has a main chain consisting of a methacrylic ester which has a number average molecular weight of 3,000 to 50,000, a vinyl group at one end of the main chain, and a glass transition temperature of the homopolymer of 40° C. or more.

Exemplary methacrylic macromonomers include, for example, macromonomers having a main chain consisting of homopolymers and copolymers of methyl methacrylate, ethyl methacrylate, phenyl methacrylate, t-butyl methacrylate and cyclohexyl methacrylate.

A methacrylic macromonomer having a number average molecular weight of less than 3,000 cannot provide a comb copolymer with satisfactory mechanical properties. On the other hand, when the number average molecular weight of the macromonomer is in excess of 50,000, synthesis of the comb copolymer becomes difficult because of a decrease in reactivity, and resulting comb copolymer has inferior transparency and impact resistance.

The number average molecular weight of the methacrylic macromonomer is more preferably ranges from 4,000 to 30,000.

The methacrylate ester homopolymer constituting the main chain of the methacrylic macromonomer which have a glass transition temperature of less than 40° C. is not preferable, because a comb copolymer having excellent mechanical properties and weatherability cannot be obtained.

The above methacrylic macromonomer can be prepared by various conventionally known methods. These methods include, for example, a method comprising conducting anion living polymerization of the methacrylate ester at a low temperature under a high vacuum in a sufficiently dehydrated and purified solvent, followed by reacting the resultant living polymer with a halogen containing vinyl compound to obtain the macromonomer; a method comprising conducting radical polymerization of the methacrylic ester in the presence of a chain transfer agent such as mercaptoacetic acid which has a carboxyl group, followed by reacting the resultant oligomer having a terminal carboxyl group with a vinyl compound having a glycidyl group such as glycidyl methacrylate to obtain the macromonomer; a method comprising conducting living polymerization of the methacrylic ester by using a compound such as ketenetrimethylsilyl acetal as an initiator in an inert gas atmosphere in the presence of a donor compound of anions such as $HF_2^-$, $(CH_3)SiF_2^-$ and $F^-$ in a sufficiently dehydrated and purified solvent, followed by reacting the resultant living polymer with a halogen containing vinyl compound such as p-vinylbenzyl bromide to obtain the macromonomer; and a method comprising conducting polymerization of the methacrylic ester by using ketenesilyl acetal having a styryl group such as vinylphenylketenetrimethylsilyl acetal as an initiator in an inert gas atmosphere in the presence of the donor compound of anions such as $HF_2^-$, $(CH_3)SiF_2^-$ and $F^-$ in a sufficiently dehydrated and purified solvent.

The acrylic ester used in the copolymerization with the macromonomer in the present invention has a glass transition temperature of the homopolymer of 0° C. or less. Exemplary acrylic ester include, for example, ethyl acrylate, n-butyl acrylate, hexyl acrylate, octyl acrylate, 2,2,2-trifluoroethyl acrylate, 4,4,5,5-tetrafluoro-3-oxapentyl acrylate and 2,2,3,3,5,5,5-heptafluoro-4-oxapentyl acrylate. The acrylic ester may be used alone or in combination. n-Butyl acrylate is most preferred. Where an acrylic ester having a glass transition temperature above 0° C. is used, the resulting comb elastomer does not exhibit sufficient characteristics or the resultant comb resin does not have excellent impact resistance.

The ratio of the methacrylic macromonomer to the acrylic ester monomer in the constitution of the comb elastomer of this invention is 20 to 60 parts by weight of the macromonomer per 80 to 40 parts by weight of the acrylic ester monomer. When the ratio of the macromonomer exceeds 60 parts by weight, the resultant elastomer cannot obtain the required flexibility. On the other hand, a ratio of the macromonomer or less than 20 parts by weight cannot provide sufficient mechanical strength.

The ratio of the methacrylic macromonomer to the acrylic ester monomer in the constitution of the comb resin of this invention is 60 to 90 parts by weight of the methacrylic macromonomer per 40 to 10 parts by weight of the acrylic ester monomer. The preferred ratio is 65 to 90 parts by weight of the methacrylic macromonomer per 35 to 10 parts by weight of the acrylic ester monomer. Where the ratio of the acrylic ester monomer is less than 10 parts by weight, satisfactory impact resistance cannot be obtained in the resulting resin. On the other hand, a ratio exceeding the upper limit enhances elastomeric properties and is unfavorable. because the resulting comb resin has inferior hardness and modulus of elasticity.

The acrylic comb copolymer of this invention can be prepared by copolymerizing the above methacrylic macromonomer with the acrylic ester. The copolymerization is most readily and preferably carried out by radical polymerization. Any method and condition of radical polymerization can be employed so long as the resultant comb copolymer is 50,000 or more in molecular weight corresponding to the peak top of the molecular weight distribution curve measured by the GPC method. Preferred examples of the polymerication method include. but are not limited to, the first and second suspension polymerization methods described above.

In the present invention, the molecular weight corresponding to the peak top of the molecular weight distribution curve is measured by the GPC method under the conditions described below (in the examples. molecular weight corresponding to the peak top measured by the GPC method is abbreviated as peak top molecular weight). The values of the number average molecular weight illustrated in the examples are number average molecular weights measured by the same conditions. GPC measuring conditions:

Instrument: 201D Compact Model (a product of Waters Inc.)
Column: TSK gel GMHKL + 4000XHL + 2500HXL
Solvent: Tetrahydrofuran
Temperature: 30° C.
Flow rate: 0.7 ml/min
Sample concentration: about 1%
Detector: Differential refractometer The comb elastomer of this invention can remarkably improve the impact resistance of a methyl methacrylate (co)polymer by blending 5 to 50 parts by weight of the elastomer with 100 parts by weight of the methyl methacrylate (co)polymer.

The term "methyl methalcrylate (co)polymer" described herein means a methyl methacrylate homopolymer or copolymer of methyl methacrylate with other methacrylic esters or acrylic ester which contains 70% by weight or more of methyl methacrylate units and has a molecular weight almost equal to that of methacrylic molding materials which are commonly available in the market.

When the comb elastomer of this invention is blended in an amount of less than 5 parts by weight per 100 parts by weight of the methyl methacrylate (co)polymer, improvement of impact resistance is unsatisfactory. A blending amount in excess of 50 parts by weight is unfavorable. because properties such as thermal resistance are lowered and essential characteristics of the methyl methacrylate (co)polymer are lost.

Mixing of the methyl methacrylate (co)polymer with the comb elastomer of this invention can be readily carried out by using methods which are commonly employed for the mixing of resins. The methods include, for example, carrying out melt-kneading with a Banbury mixer, roll mill or screw mixer; and dissolving the polymer and elastomer in a common solvent and subsequently precipitating at the same time in a bad solvent.

The present invention will hereinafter be illustrated further in detail by way of examples.

In the examples. "parts" means parts by weight.

The evaluation of various properties in the examples were carried out by the methods described below.

Tensile elastic modulus, tensile strength at break, and elongation at break were measured in accordance with JIS K-6745. The values of tensile strength at break were calculated on the basis of the initial sectional area of the specimen.

Light transmittance was measured in accordance with ASTM D-1003. The sheet specimens had a thickness of 200 μm and the molded plate specimens had a thickness of 3.2 mm.

Weatherability was evaluated by the retention rate of elongation at break after exposure for 2,000 hours in a sunshine weatherometer.

Izod impact strength was evaluated with a ¼" notched specimens in accordance with ASTM D-256.

Heat distortion temperature was measured under an 18.56 kg load in accordance with ASTM D-648.

SYNTHESIS EXAMPLE 1

A 1 l reaction vessel equipped with an argon inlet. stirrer and an exhaust tube was used. After sufficiently replacing interior of the vessel with argon gas, 300 ml of sufficiently dehydrated tetrahydrofuran, 0.2 ml of trisdimethylaminosulfonium bifluoride in the form of 0.04 mol solution in acetonitrile and 5 mmol of vinylphenylketenetrimethylsilyl acetal as an initiator were charged. stirred and the temperature of the solution was set at 0° C.

Then, 0.5 mole of methyl methaclrylate was added dropwise over 20 minutes with caution so as to maintain temperature of the reaction system at 30° C. or less, and further reacted for 48 hours. After completing polymerization reaction. 10 ml of a methanol solution containing 0.1 mole of hydrogen chloride was added to the reaction mixture and stirred for 10 minutes to deactivate the propagating chain end of the polymer and to terminate the reaction.

Subsequently, the macromonomer was precipitated in hexane. filtered and dried under vacuum at a temperature of 50° C. or less. The macromonomer thus obtained was a white powder and had a number average molecular weight of 10,000 and molecular weight distribution of 1.2. The introduction of one styryl group per one molecule was confirmed by NMR.

SYNTHESIS EXAMPLES 2-5

The same procedures as described in Synthesis Example 1 were carried out, except that the amount of the initiator was varied. Macromonomers having number average molecular weights of 1000, 5000, 20,000 and 30,000 were prepared.

EXAMPLE 1

A solution was prepared by mixing 40 parts of methyl ethyl ketone (hereinafter abbreviated as MEK) which has solubility in water of 20 to 30% by weight at 20° to 60° C., and 60 parts of n-butyl acrylate (hereinafter abbreviated as BuA). To the solution, 40 parts of powdery methaclrylic macromonomer (AA-6 TM, a product of Toa Gosei Chemicals Ltd.,monomer unit of its main chain is methylmethacrylate) having a number average molecular weight. (hereinafter expressed by Mn) of 6,000 were dissolved and 0.05 parts of n-octyl mercaptan was added and thus a uniform solution was made. To the solution, 1 part of lauryl peroxide was added as a polymerization initiator and stirred to prepare a uniform monomer/initiator solution.

To a reaction vessel equipped with a stirrer, a condenser and a nitrogen gas inlet, 400 parts of deionized water, 1 part of a calcium phosphate type dispersion stabilizer and 101.05 parts of the monomer/initiator solution were charged. Interior of the vessel was sufficiently replaced with nitrogen and then the aqueous suspension was heated to 70° C. with stirring to initiate polymerization. Polymerization was carried out at 70° C. for 3 hours. Then the temperature of the aqueous suspension was raised to 90° C. over an hour and maintained at 90° C. for an hour to complete polymerization. The aqueous suspension was cooled to 40° C., and the reaction product was filtered, washed, dehydrated and dried overnight at 70° C. to obtain polymer beads. The polymer obtained had an average particle size of about 100 μm, had no fusing of the particle with each others and was excellent as the suspension polymerized particle. The comb copolymer obtained had an average molecular weight of 95,000 and molecular weight distribution (hereinafter expressed by Mw/Mn) of 3.5.

EXAMPLES 2-7 AND COMPARATIVE EXAMPLES 1-3

PMMA (branch)-PBuA (backbone) comb copolymer were prepared by carrying out the same procedures as described in Example 1, except that the solvents shown in Table 1 were used in place of MEK. The results are illustrated in Table 1. When the solvents had a solubility of 10% by weight or more in water as illustrated in the examples, good results were obtained. On the other hand, in the cases where solvents having a solubility of less than 10% by weight in water were used, the comb polymers obtained had a low molecular weight and unfavorable properties. Further satisfactory results could not be obtained due to fusing occurring in the course of polymerization and during drying.

TABLE 1

| Example No. | Solvent | Solubility in water (%) | Polymerization | Mn | Mw/Mn |
|---|---|---|---|---|---|
| Example 2 | Acetone | ∞ | Good | 150000 | 3.1 |
| Example 3 | Cyclohexanone | 15 | Good | 55000 | 5.5 |
| Example 4 | Dioxane | ∞ | Good | 150000 | 3.2 |
| Example 5 | 1,2-diethoxyethane | 21 | Good | 75000 | 3.6 |
| Example 6 | Acetonitrile | ∞ | Good | 180000 | 2.8 |
| Example 7 | Methyl acetate | 24 | Good | 50000 | 4.2 |
| Comparat Ex 1 | Toluene | <0.1 | Fusing | 24000 | 3.7 |
| Comparat Ex 2 | Methyl isobutyl ketone | 2 | Fusing | 30000 | 2.5 |
| Comparat Ex 3 | Ethyl acetate | 8 | Fusing | 36000 | 7.5 |

EXAMPLE 8

The same procedures as described in Example 1 were carried out, except that in place of the methacrylic macromonomer, a polystyrene (Pst) macromonomer (AS-6 TM, a product of Toa Gosei Chemicals Inc.) which had Mn of 6,000 and had a methacryloyl group as a reactive group was used.

A PSt (branch)-PBuA (backbone) comb copolymer was prepared in the form of beads having an average particle size of about 80 μm.

The comb copolymer had Mn of 80,000 and Mw/Mn of 3.0

EXAMPLE 9

The same procedures as described in Example 1 were carried out, except that 2,2,2-trifluoroethyl methacrylate (3FM) was used in place of BuA.

A PMMA (branch)-P3FM (backbone) comb copolymer was prepared in the form of beads having an average particle size of about 120 μm.

The comb copolymer had Mn of 70,000 and Mw/Mn of 4.0.

EXAMPLE 10

The same procedures as described in Example 1 were carried out, except that PBuA macromonomer (AB-6 TM, a product of Toa Gosei Chemicals Inc.) which had Mn of 6,000 and contained a methacryloyl group as a reactive group was used in place of methacrylic macromonomer and MMA was used as the monomer in place of BuA.

A PBuA (branch)-PMMA (backbone) comb copolymer was thus prepared in the form of beads having an average particle size of about 110 μm.

The comb copolymer had Mn of 45,000 and Mw/Mn of 15.

EXAMPLES 11-13

PMMA (branched)-PBuA (backbone) comb copolymers were prepared by carrying out the same procedures as described in Example 1, except that the amounts of MFK used were varied as illustrated in Table 2.

As illustrated in Table 2, good results were obtained in these examples.

TABLE 2

| Example No. | MEK (parts) | Polymerization | Mn | Mw/Mn |
|---|---|---|---|---|
| 11 | 20 | Good | 130000 | 4.2 |
| 12 | 70 | Good | 70000 | 3.2 |
| 13 | 150 | Good | 50000 | 3.0 |

EXAMPLE 14

A PMMA (branch)-PBuA (backbone) comb copolymer was prepared by carrying out the same procedures as described in Example 1, except that the macromonomer obtained in Synthesis Example 1 was used in place of the methacrylic macromonomer AA-6 and n-octyl mercaptan was omitted.

The comb copolymer thus obtained had Mn of 110,000 and Mw/Mn of 2.0

EXAMPLE 15

A PMMA (branch)-PBuA (backbone) comb elastomer was prepared by carrying out the same procedures as described in Example 1, except that n-octyl marcaptan was used in an amount of 0.1 part and 1 part of azobis-isobutyronitrile was used as a polymerization initiator in place of lauryl peroxide.

The comb elastomer thus obtained had a peak top molecular weight of 250,000.

After the comb elastomer was sufficiently dried, a sheet having a thickness of about 0.2 mm was molded by extruding with a small kneading extruder at a die temperature of 190° C. Various properties were measured on the sheet. The results were shown below. The acrylic comb elastomer thus obtained had satisfactory properties.

| | |
|---|---|
| Tensile elastic modulus | 500 kg/cm |
| Tensile strength at break | 100 kg/cm |
| Elongation at break | 500% |
| Light transmittance | 95% |
| Weatherability | 82% |

(Retention rate of elongation at break)

Example 1 exhibited unsatisfactory properties as an elastomer. Reference Example 2 was remarkably inferior in mechanical properties and unsuitable as an acrylic elastomer.

EXAMPLES 20–23 AND REFERENCE EXAMPLE 3

Comb elastomer were prepared by carrying out the same procedures as described in Example 15, except that the macromonomers prepared in Synthesis Example 1–5 and having different molecular weights were used. Sheets were prepared from these elastomers and various properties were evaluated.

The results are illustrated in Table 4. Good results were obtained on the sheets of Examples 20–23. In the case of Reference Example 3, the comb elastomer caused fusing in the drying step and sheets could not be prepared.

TABLE 3

| Example No | Macro-monomer (parts) | Monomer (parts) | Peak top molecular weight | Tensile elastic modulus (Kg/cm²) | Tensile strength (Kg/cm²) | Elongation (%) | Light transmittance (%) | Weatherability (%) |
|---|---|---|---|---|---|---|---|---|
| 16 | 55 | 45 | 200000 | 2000 | 180 | 350 | 94 | 85 |
| 17 | 45 | 55 | 230000 | 1200 | 150 | 400 | 93 | 81 |
| 18 | 35 | 65 | 210000 | 300 | 90 | 450 | 93 | 80 |
| 19 | 25 | 75 | 280000 | 100 | 80 | 350 | 92 | 75 |
| Reference Ex. 1 | 80 | 20 | 150000 | 12000 | 650 | 15 | 94 | 89 |
| Reference Ex. 2 | 10 | 90 | 220000 | 10 | 20 | 150 | 89 | 45 |

TABLE 4

| Example No | Macro-Monomer Mn | Peak top molecular weight | Tensile elastic modulus (Kg/cm²) | Tensile strength (Kg/cm²) | Elongation (%) | Light transmittance (%) | Weatherability (%) |
|---|---|---|---|---|---|---|---|
| 20 | 5000 | 250000 | 350 | 100 | 450 | 94 | 83 |
| 21 | 10000 | 260000 | 570 | 135 | 570 | 94 | 82 |
| 22 | 20000 | 270000 | 630 | 140 | 550 | 93 | 81 |
| 23 | 30000 | 230000 | 660 | 150 | 480 | 93 | 75 |
| Reference Ex. 3 | 1000 | 250000 | evaluation impossible | | | | |

EXAMPLES 16–19 AND REFERENCE EXAMPLES 1–2

Comb elastomers were prepared by carrying out the same procedures as described in Example 15, except that the ratio of macromonomer to monomer was varied as illustrated in Table 3. Sheets were molded and various properties were evaluated. When the ratio, macromonomer/monomer, was 30/70 or less, the solvent (NEK) for dissolving the macromonomer was not used.

The evaluation results on various properties are illustrated in Table 3. Good results were obtained on the sheets of Examples 16–19. On the other hand, Reference

EXAMPLES 24–26 AND REFERENCES EXAMPLE 4

Comb elastomers were prepared by carrying out the same procedures as described in Example 15, except that acrylic ester monomers used were changed as illustrated in Table 5. Sheets were molded from the comb elastomers and their properties were evaluated.

The results are illustrated in Table 5. Good results were obtained on the sheets of Examples 24–26. In the case of Reference Example 4, properties obtained were unsatisfactory as a elastomer.

TABLE 5

| Example No | Acrylic ester | Peak top molecular weight | Tensile elastic modulus (Kg/cm²) | Tensile strength (Kg/cm²) | Elongation (%) | Light transmittance (%) | Weatherability (%) |
|---|---|---|---|---|---|---|---|
| 25 | EA | 220000 | 750 | 150 | 400 | 93 | 83 |
| 26 | HA | 190000 | 350 | 85 | 350 | 91 | 80 |
| 27 | 3FA | 240000 | 400 | 150 | 600 | 93 | 90 |
| Reference | MA | 210000 | 7200 | 350 | 15 | 94 | 86 |

TABLE 5-continued

| Example No. | Acrylic ester | Peak top molecular weight | Tensile elastic modulus (Kg/cm²) | Tensile strength (Kg/cm²) | Elongation (%) | Light transmittance (%) | Weatherability (%) |
|---|---|---|---|---|---|---|---|
| Ex. 4 | | | | | | | |

Note
EA Ethyl acrylate (Glass transition temperature of homopolymer = −24° C.)
HA Hexyl acrylate (Glass transition temperature of homopolymer = −5° C.)
3FA 2,2,2-trifluoroethyl acrylate (Glass transition temperature of homopolymer = −10° C.)
MA Methyl acrylate (Glass transition temperature of homopolymer = 10° C.)

EXAMPLES 27–30 AND REFERENCE EXAMPLE 5–6

The comb elastomer prepared in Example 15 was blended with 100 parts of PMMA resin beads (Acrypet VHK ™, a product of Mitsubishi Rayon Co., Ltd.) in an amount illustrated in Table 6 and subjected to extrusion with a screw extruder to obtain pellets of acrylic resin composition. Pellets thus obtained were sufficiently dried and injection molded. Specimens for measuring impact strength and heat distortion temperature and plates having a thickness of 3.2 mm for use in measuring light transmittance were molded and used for evaluating various properties. The results are illustrated in Table 6.

TABLE 6

| Example No. | Comb-type elastomer Amount (parts) | Izod impact strength (Kg-cm/cm) | Light transmittance (%) | Hot distortion temperature (°C.) |
|---|---|---|---|---|
| 27 | 10 | 3.7 | 93 | 96 |
| 28 | 20 | 8.0 | 92 | 93 |
| 29 | 30 | 9.2 | 92 | 90 |
| 30 | 40 | 10.5 | 91 | 84 |
| Reference Ex. 5 | 3 | 1.6 | 93 | 100 |
| Reference Ex. 6 | 60 | — | 89 | 65 |

EXAMPLE 31

A PMMA (branch)-PBuA (backbone) comb resin was prepared by carrying out the same procedures as described in Example 1, except that 80 parts of the methacrylic macromonomer, 80 parts of MEK and 20 parts of n-butyl acrylate were used.

The comb resin obtained had a peak top molecular weight of 130,000.

The comb resin was sufficiently dried and pelletized with a screw extruder. The pellets were injection molded to prepare specimens for measuring various physical properties. The evaluation results were shown below. Properties are satisfactory for an impact resistant acrylic resin.

| Izod impact strength | 4.2 kg-cm/cm |
|---|---|
| Heat distortion temperature | 91° C. |
| Light transmittance | 93% |

EXAMPLES 32–34 AND REFERENCE EXAMPLES 7–8

Comb resins were prepared by carrying out the same procedures as described in Example 31, except that the ratio of macromonomer to monomer was varied as illustrated in Table 7.

The comb resins obtained were molded into various specimens and physical properties of the resins were evaluated.

The results are illustrated in Table 7. Good results were obtained on the resin of Examples 32–34. On the other hand, improvement of impact strength was still insufficient in Reference Example 7. Reference Example 8 had elastomer-like properties rather than light transmittance.

TABLE 7

| Example No. | Macromonomer (parts) | Monomer (parts) | Peak top molecular weight | Izod impact strength (kg-cm/cm) | Heat distortion temperature (°C.) | Light transmittance (%) |
|---|---|---|---|---|---|---|
| 32 | 90 | 10 | 90000 | 2.5 | 96 | 93 |
| 33 | 75 | 25 | 160000 | 5.3 | 90 | 92 |
| 34 | 65 | 35 | 210000 | 7.8 | 82 | 93 |
| Reference Ex. 7 | 95 | 5 | 55000 | 1.8 | 98 | 93 |
| Reference Ex. 8 | 50 | 50 | 220000 | — | 55 | 89 |

EXAMPLE 36

To a solution of 50 parts of butyl aclrylate in 50 parts of chloroform which forms an aqueous azeotropic mixture at 50° C., 50 parts of methacrylic macromonomer powder AA-6 and 0.3 part of n-octyl mercaptan were dissolved. To the uniform solution obtained, 1 part of lauryl peroxide was added as a polymerization initiator with stirring to prepare a uniform monomer/initiator solution.

To a reaction vessel equipped with a stirrer, condenser, and a nitrogen inlet, 400 parts of deionized water, 1 part of calcium phosphate dispersion stabilizer and 151.3 parts of the monomer/initiator solution were charged.

Interior of the vessel was sufficiently replaced with nitrogen and then the solution was heated to 70° C. with stirring to start polymerization. After conducting polymerization at 70° C. for 3 hours, the solution was raised the temperature to 90° C. over an hour and further maintained at the same temperature for an hour to complete polymerization.

The reaction product was cooled to 40° C., filtered, washed, dehydrated and dried overnight at 70° C. to obtain polymer beads having an average particle size of about 120 μm. No mutual fusing was observed on the particles and the beads thus obtained were excellent as suspension polymerized particles.

The PMMA (branch)-PBuA (backbone) comb copolymer obtained had a number average molecular weight of 82,000 and molecular weight distribution of 2.5.

EXAMPLE 36 AND COMPARATIVE EXAMPLES 4-6

PMMA (branch)-PBuA (backbone) comb copolymers were prepared by carrying out the same procedures as described in Example 35 except that solvents illustrated in Table 8 were used in place of chloroform.

The results are illustrated in Table 8. Even though solvents had azeotropic points with water at less than 90° C., the solvents other than halogenated hydrocarbon provided comb copolymers having low molecular weight or led to fusing in the course of polymerization or in the drying step, which situation could not afford satisfactory results.

TABLE 8

| Example No | Solvent | Azeotropic point (°C.) | Polymerization | Mn | Mw/Mn |
|---|---|---|---|---|---|
| 36 | 1,2-Dichloroethane | 71.8 | Good | 75000 | 3.2 |
| Comparat Ex. 4 | Toluene | 84.1 | Fusing | 24000 | 3.7 |
| Comparat Ex. 5 | Methyl isobutyl ketone | 87.9 | Fusing | 30000 | 2.5 |
| Comparat Ex. 6 | Ethyl acetate | 70.4 | Fusing | 36000 | 7.5 |

According to the method for the preparation of the comb copolymer of this invention, the ratio of the macromonomer constituting the branch part of the comb copolymer to the vinyl monomer constituting the backbone part of the same can be selected in a broad range. The comb copolymer having a considerably high molecular weight can also be prepared by the method. As a result, structural range of the comb copolymer which can be prepared has markedly extended and it has become possible to fully utilize excellent characteristics of the comb copolymer.

The present invention has provided a novel acrylic elastomer having a comb copolymer structure which maintains characteristics of the acrylic elastomer being excellent in transparency and weatherability.

The comb copolymer can also be employed for a modifier of impact resistance by blending with methacrylic resin.

The present invention has also provided an acrylic comb copolymer resin which is an acrylic resin having outstanding impact resistance in addition to the excellent properties of the acrylic resin such as transparency, weatherability and gloss.

What is claimed is:

1. A preparation method of a comb copolymer comprising mixing a polymer having a main chain consisting essentially of a methacrylic ester monomer ester unit acrylic ester monomer ester unit or styrene monomer unit and a vinyl group at one end of the main chain and having a number average molecular weight of 3,000 to 50,000 with a vinyl monomer and a polymerization intiator in a halogenated hydrocarbon solvent which is a good solvent for said polymer and has an azeotropic point with water ranging from 30° to 90° C., and subjecting the resultant mixture to aqueous suspension polymerization at a temperature above the azeotropic point of said solvent with water.

2. The preparation method of claim 1 wherein said halogenated hydrocarbon solvent has an azeotropic point with water ranging from 30° to 80° C.

3. The preparation method of claim 1 wherein said halogenated hydrocarbon solvent is chloroform or 1,2-dichloroethane.

4. The preparation method of claim 1 wherein the weight ratio of said polymer to the vinyl monomer ranges from 95/5 to 10/90.

5. The preparation method of claim 1 wherein said solvent is used in an amount from 30 to 300 parts by weight per 100 parts by weight of said polymer.

6. The preparation method of claim 1 wherein the weight ratio of the total monomer amount consisting of said polymer and said vinyl monomer to the amount of water in the aqueous suspension polymerization ranges from 1/1.5 to 1/6.

* * * * *